United States Patent [19]

Kissel et al.

[11] Patent Number: 5,173,018
[45] Date of Patent: Dec. 22, 1992

[54] SECURITY SYSTEM FOR WHEELED VEHICLES RESIDING ON A MOVING DECK

[76] Inventors: James L. Kissel, 2204 Cedar Dr.; Earl J. Dailey, 4831 W. Main St., both of, Cedar Rapids, S. Dak. 57702

[21] Appl. No.: 667,874

[22] Filed: Mar. 12, 1991

[51] Int. Cl.[5] .............................................. B60F 3/00
[52] U.S. Cl. ....................................... 410/30; 188/32; 410/57; 410/65
[58] Field of Search ................... 410/9, 19, 30, 49, 52, 410/56, 57, 65, 66, 67; 188/32, 36; 414/426, 429, 563; 294/81.5, 904

[56] References Cited

U.S. PATENT DOCUMENTS

| | | | |
|---|---|---|---|
| 1,968,196 | 7/1934 | Francis | 214/38 |
| 2,011,469 | 8/1935 | Brueggemann | 188/32 |
| 2,773,564 | 12/1956 | Garard, Sr. | 188/32 |
| 2,855,115 | 10/1958 | Casey, III | 214/38 |
| 2,944,492 | 7/1960 | Clejan | 105/368 |
| 3,012,524 | 12/1961 | Buisson et al. | 105/368 |
| 3,033,129 | 5/1962 | Grandpre | 105/368 |
| 3,070,041 | 12/1962 | Gutridge | 105/366 |
| 3,074,569 | 1/1963 | Ajero | 214/38 |
| 3,120,292 | 2/1964 | Rambat | 188/32 |
| 3,149,583 | 9/1964 | Morrill | 188/32 X |
| 3,305,049 | 2/1967 | Willey | 188/32 |
| 3,305,050 | 2/1967 | Newberry | 188/32 |
| 4,031,726 | 6/1977 | DeJager | 188/32 X |
| 4,066,289 | 1/1978 | Gargour | 410/30 |
| 4,076,134 | 2/1978 | Landow | 214/38 |
| 4,155,429 | 5/1979 | Schessl | 188/32 |
| 4,382,733 | 5/1983 | Rodgers | 410/49 |
| 4,828,076 | 5/1989 | Fox | 188/32 |

Primary Examiner—Michael S. Huppert
Assistant Examiner—James Eller
Attorney, Agent, or Firm—1000 Norwest Center; St. Paul, MN 55101; Merchant, Gould, Smith, Edell, Welter & Schmidt

[57] ABSTRACT

An improved wheel clamp 1 including a first wheel chock (25) and a second wheel chock (29), interconnected by a first threaded rod (44) and a second threaded rod (46), the threaded rods being driven by a motor (43) driving chains (45, 47) such that rotation of the threaded rods urge the wheel chocks (25, 29) away from each other and into an abutting relationship with vehicle tires (11, 12). A pair of hold down clamps (33, 38) reside in a pivotable relationship adjacent to the wheel chocks (25, 29) and rotate upward to grip an inner surface of the tires (11, 12) as the wheel chocks engage the tires.

9 Claims, 3 Drawing Sheets

SECURITY SYSTEM FOR WHEELED VEHICLES RESIDING ON A MOVING DECK

FIELD OF THE INVENTION

This invention relates generally to the field of wheel clamps, and more particularly to a securing system for holding wheeled vehicles onto railcars and ship decks or other inherently unstable platforms.

DESCRIPTION OF RELATED TECHNOLOGY

Many goods are shipped in wheeled vehicles such as tractor trailers and other truck-type vehicles. Oftentimes the goods contained in these vehicles must be successively shipped by rail, sea or air before reaching their final destination. Many schemes have been developed to avoid the problem of having to unload the contents of a tractor-trailer, for example, when placed upon an ocean-going vessel, for example, only to be repacked onto at tractor trailer in order to reach their final distribution point. "Containerized cargo" is one attempt to address this problem, in which a container of standard dimensions is placed upon a ship, railcar, or airplane, and which may also be conveniently placed upon a trailer pulled by a truck, thereby avoiding the need to actually handle the contents of the container as each mode of transportation is encountered.

However, some shipments, because of the low volume of shipping, special nature of the cargo, need for expedited handling, or other considerations require that the goods reside on a tractor or other wheeled vehicle during the entire shipping process. Occasionally, the wheeled vehicle itself is the subject of the shipment. In these instances, the entire vehicle must be placed upon an airplane, ship or railcar and must be held in a stable configuration during transportation yet be easily removable at the point of disembarkation.

Many systems have been devised to speed the loading and unloading of wheeled vehicles onto ships and railcars, and to secure the wheeled vehicle during transport. For example, U.S. Pat. No. 1,968,196 is directed to a system for loading and unloading trailers from railroad cars whereby the handling of goods is at a minimum. The invention provides means in combination with a railroad car and a trailer whereby one or more highway trailers or vehicles may be unloaded from a railroad car by the provision of a means such as a standard on the car and a cooperative device on the highway vehicle permitting the vehicle to be backed onto the car to engage with the standard pivoted thereon while supported by its own wheels.

U.S. Pat. No. 2,855,115 is directed to a system for transferring vehicles to railcars by providing an elevated loaded platform with a drawbridge-type ramp having wheels at its lower end for rolling engagement along the floor of a railcar movable along a lower level below the loading platform and ramp, the car floor being formed with wheel wells to receive the rear wheels of the highway trailer and secure the same in fixed position on the car for transport.

U.S. Pat. No. 2,944,492 is directed to railway cars for transporting road vehicles which is provided with two longitudinally cushioned shafts mounted in its frame and carrying engaging means or hooks for engaging and holding down a road vehicle which has wheels resting on the freight car.

U.S. Pat. No. 3,012,524 is directed to a car for shipping road vehicles by rail to provide an improved flat car construction designed for shipment by rail of heavy duty road vehicles. The invention comprises equipping a railway truck or flat car with a swinging frame adapted in a raised condition to provide a continuous riding track longitudinally within the car and adapted to be lowered into an opening or recess formed in the platform between the car axles for receiving the rear set of wheels of the semi-trailer which, when in its lower position, is adapted to provide an incline providing a continuous track for said vehicle from the bottom of the opening to one end of the car.

U.S. Pat. No. 3,033,129 is directed to systems of freight transportation wherein railway flat cars are replaced by turning of railway skeleton cars which are characterized by the absence of bodies and having only narrow frames lying wholly between the planes of the inner sides of the wheels. The upper side edges of the frame serve as an outwardly facing track of narrow gauge for supporting road vehicles.

U.S. Pat. No. 3,074,569 is directed to a side loading and unloading structure for railway carried highway trailers which comprises a platform which can be moved alongside either side of a railroad flat car between the flat car and the roadway and has a raisable and lowerable ramp carried on a turntable located at one end of the mobile platform structure and rotatable to either side according to the orientation of the flat car to the adjoining roadway.

U.S. Pat. No. 4,076,134 is directed to a wheel ramp loading and unloading apparatus in which tractor-trailer combinations are loaded and unloaded to and from flat cars by means of a ramp at one end of the train and the tractors are loaded to and from the train at the side of the train. The vehicles move in a re-entrant path which includes the tops of the railroad cars, a ramp at one end of the train, a return path on the ground and a ramp structure at the side of the train. By moving the tractors to and from the train by means of the ramp at the side of the train, the empty or light flat cars return on the ground rather than along the tops of the flat cars, thus freeing the tops of the flat cars for use in loading and unloading trailers. This permits several tractors to load and unload trailers in sequence, thus increasing the speed of the operation.

U.S. Pat. No. 3,070,041 is directed to a highway/railway transportation system and apparatus which enables a variety of container loads to be carried on a railway car without the usual loading and unloading of separate freight pieces. A special type of semi-trailer is employed which is separable from the load container which it supports.

SUMMARY OF THE INVENTION

The present invention serves to simplify the problem of transporting a wheeled vehicle on an inherently unstable platform, such as a ship, airplane or railroad car. The invention is an improved adjustable wheel clamp assembly which may be retrofitted onto the surface of an existing rail, ship, or airplane deck. The wheel clamp includes a pair of chocks residing astride a longitudinal axis substantially parallel to the longitudinal axis of the wheeled vehicle. The chocks may be moved laterally such that the wheels are physically engaged not only by the front and back of the chock, but also by the side of the chock. Further, a movable hold-down clamp is pivoted into position so as to engage an inner portion of the wheel, thereby preventing any rotation or translation of the wheel thus secured. The improved wheel clamp may be operated either by means of an electric motor or a hand operated gearing mechanism operating through an idler.

DESCRIPTION OF THE PREFERRED EMBODIMENTS

Figure 1:
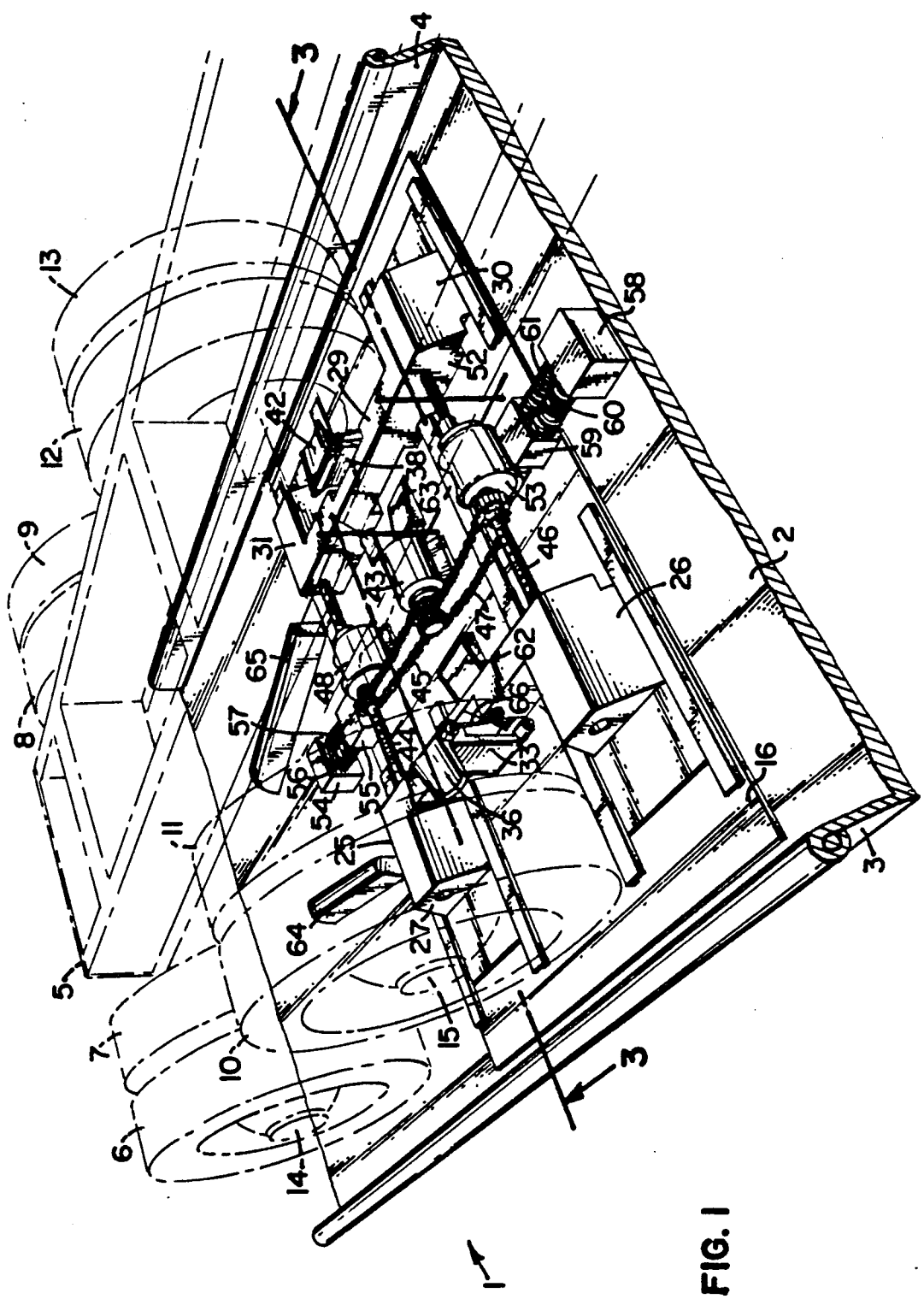
FIG. 1 is a perspective view of a wheel clamp constructed in accordance with the principles of the present invention, with a wheeled vehicle shown in phantom as it would be secured by the invention.

Referring to FIG. 1, the improved wheel clamp of the present invention is shown generally at 1. The wheel clamp 1 is mounted on a vehicle car floor 2, the car floor being a portion of a ship, railcar, airplane or the like. The sidewalls 3 and 4 will be spaced apart by a distance dictated by the particular construction of the airplane, ship or railcar, and will not normally be alterable by the user. The only requirement is that the distance between sidewalls 3 and 4 be great enough to accommodate the wheeled vehicle 5 which is to be transported therein.

The wheeled vehicle 5 may be of any standard configuration, but would typically be of the tandem wheel configuration as shown, including tires 6 and 7 mounted as a pair on one end of axle 14 and a second pair of tires 8 and 9 mounted on an opposite end of axle 14. Similarly, tires 10 and 11 are mounted on one end of axle 15 while tires 12 and 13 are mounted at an opposite end thereof. Although eight tires are shown, the present invention is operable with any vehicle having at least a single axle and a tire.

Figure 2:
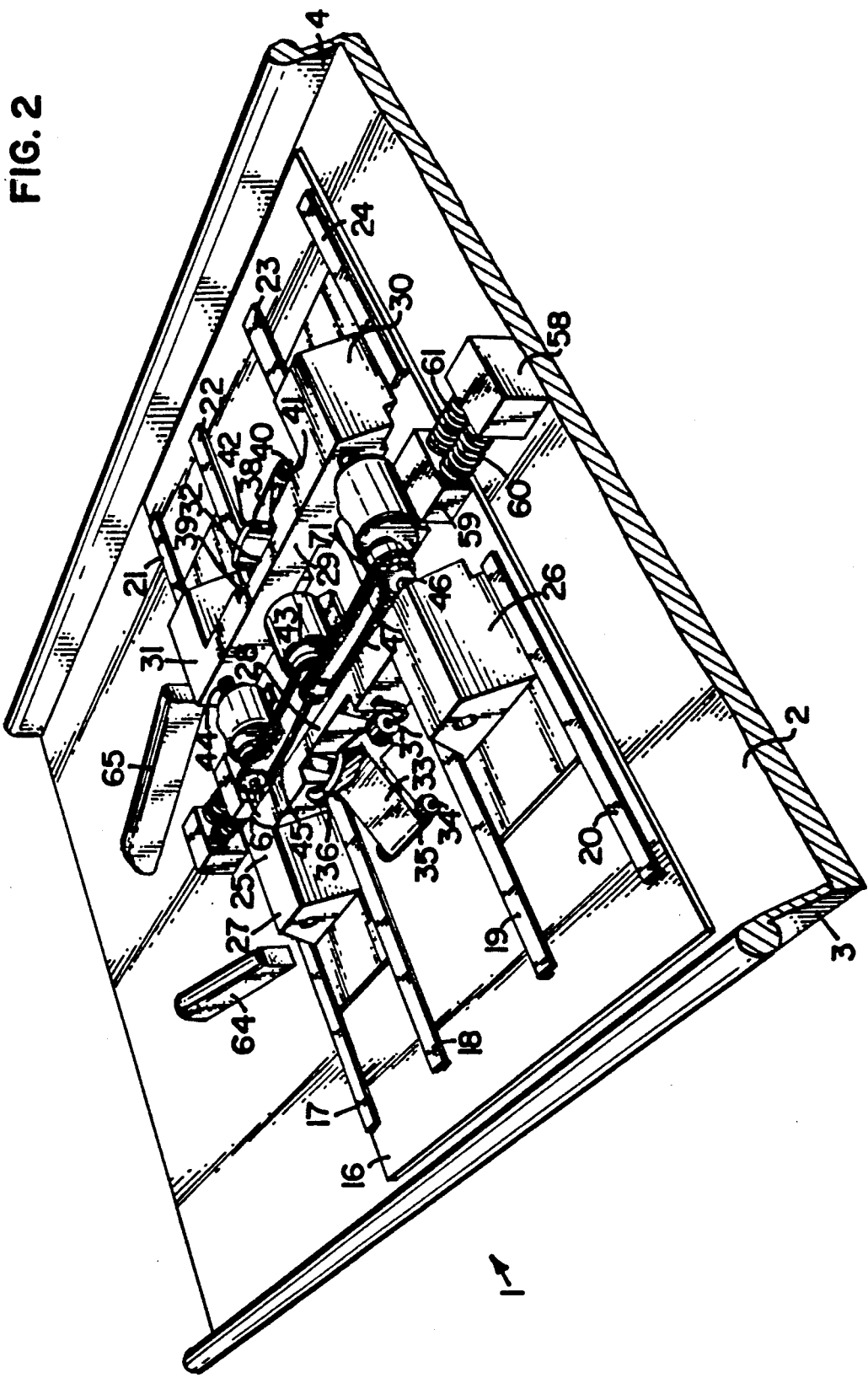
FIG. 2 is a perspective view of the wheel clamp of FIG. 1 shown in a configuration to receive a wheeled vehicle.

As seen in FIG. 2, the wheel clamp 1 is in a position ready to receive a wheeled vehicle. The wheel clamp 1 includes a securing system platform 16 which may be constructed of any suitable material such as wood, metal or composite. Platform 16 is generally planar and may be secured to the floor 2 by any suitable fasteners, such as bolts, clamps, adhesives or welding. The platform 16 may also be confined only to one dimensional movement along the longitudinal axis of the vertical and car floor by means of slots (not shown) which are fitted over upright snaps or pegs (not shown) driven into floor 2. The platform 16 may be of any suitable width to permit it to reside between side walls 3 and 4, and may be split in its central region (not shown) for those circumstances where, for example, the floor 2 has a beam or other raised discontinuity in its center which would render a single piece platform impractical.

Placed transversely to the longitudinal axis (not shown) of the vehicle and car floor are a series of transversely extending guides 17, 18, 19, 20, 21, 22, 23, and 24. The guides may be either raised slats, as shown, or grooves, rails or a combination thereof. Slidably mounted within the first set of guides 17, 18, 19 and 20 is first chock 25, which includes a forward portion 26, a rear portion 27 and a side portion 28. The forward portion 26 is confined between guides 19 and 20, while rear portion 27 resides between guides 17 and 18. As shown in FIG. 2, first guide 25 is shown at or near a fully retracted position, that is, with the chock near the central region of car floor 2.

A second guide 29 is constrained by guides 21, 22, 23 and 24, with a forward portion 30 being slidably mounted between guides 23 and 24 while rear portion 31 is mounted between guides 21 and 22. The chock is typically formed as a single, integral unit with a central region 32 spanning the area between forward portion 30 and rear portion 31. The second chock 29 is also shown at or near its fully retracted position, that is, at or near a central region of car floor 2.

Mounted adjacent to the central region 28 of first chock 25 is hold down clamp 33 which is pivotally secured to platform 16 by rod 34, which resides within bearing 35, bearing 35 being suitably affixed to platform 16. First hold down clamp 33 is formed so as to have a flange 36 which is contoured so as to mate with the inner surface of a wheel, that is, typically having a curved shape so as to contact the inner surface of a wheel in a substantially continuous fashion along its inner surface. As shown in FIG. 2, first hold down clamp 33 is at or near its fully retracted position, such that the flange 36 is between 0° and 30° from a vertical plane, and resides within recess 37 formed into the side wall of central region 28 of first chock 25. A portion of flange 36 abuts recess 37, but is inclined slightly thereto such that when first wheel chock 25 moves transversely toward the side wall 3, first hold down clamp 33 will pivot about rod 34 causing flange 36 to move upwardly as well as outwardly toward side wall 3. A chain, rope, band or other tension carrying member is pivotably affixed between the hold down clamp 33 and the first chock 25, in order to urge the hold clamp 33 away from the wheel 11 as chock 25 is retracted away from wheel 11.

Similarly, second hold down clamp 38 resides within recess 39 of central region 32 of second chock 29. Second hold down clamp 38 is pivotally mounted to car floor 2 by means of rod 40 which resides within bearing 41, bearing 41 being rigidly secured to platform 16. A flange 42 is integrally formed as a part of hold down clamp 38, flange 42 residing against the side wall of recess 39 and being inclined at an angle of typically between 0° and 30° to a vertical plane. Flange 42 is in contact with the side wall of recess 39, and as second chock 29 is moved outwardly toward side wall 4, hold down clamp 38 pivots about rod 40 and web 42 moves upwardly and outwardly toward side wall 4. The shape of flange 42 is such that it will contact a large portion of the surface to be clamped, typically the inner surface of a wheel.

Figure 3:
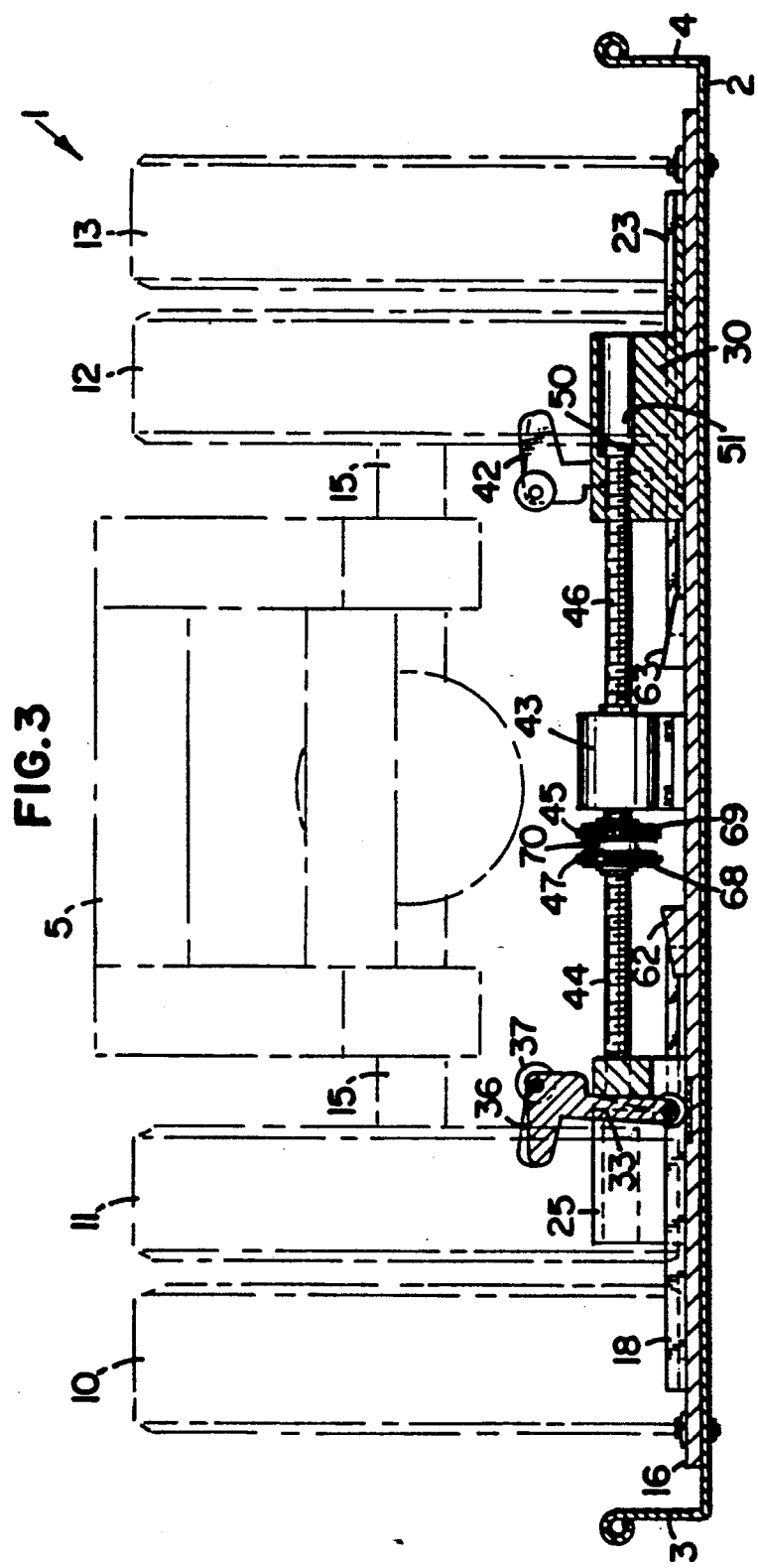
FIG. 3 is a sectional view of the improved wheel clamp constructed according to the principles of the present invention taken along line 3—3 as shown in FIG. 1.

Referring to FIGS. 1 and 3, the operation of the drive system will now be discussed. A motor 43 is mounted in a central region between chocks 25 and 29. Typically, the motor is set up for electric operation. If the wheel clamp is used for remote operations such as hauling army units to subarctic training sites, and the system must be operated without electric power, the system can be operated by use of a crank (not shown). In the event a crank system is desired, motor 43 would be replaced by an idler. Alternatively, a portable electric motor drive could be employed utilizing the same platform configuration as a hand crank system. In any event, the motor 43 is interconnected to a first threaded rod 44 which is driven by chain 45, while motor 43 is interconnected to a second threaded rod 46 which is interconnected to and driven by motor 43 by means of chain 47. Each end of the threaded rods 44 and 46 have "opposite handed" threads such that threaded objects placed at opposite ends of a rod will tend to move either forward or away from each other when the rod is rotated, rather than moving in the same lateral direction in unison. A first sprocket wheel 67 is affixed to rod 44, while second and third sprocket wheels 68 and 69 reside on motor shaft 70. A fourth sprocket wheel 71 resides on rod 46, thereby interconnecting rods 44 and 46, via chains 45 and 47, to motor 43.

As seen in FIG. 1, threaded rod 44 passes through and is supported in the central region by bearing 48, bearing 48 being rigidly mounted to platform 16. Threaded rod 44 has a first end threadably attached to rear portion 27 of first chock 25. A threaded orifice (not shown) extends through substantially the entire internal width of rear portion 27 of chock 25, thereby permitting rotational movement of threaded rod 44 to urge rear portion 27 of first chock 25 through a considerable lateral distance. Similarly, a second end of threaded rod 44 enters a threaded orifice (not shown) within rear portion 31 of second chock 29.

A second threaded rod 46 enters a threaded orifice within forward portion 26 of first chock 25. As seen in FIG. 3, the opposite end 50 of threaded rod 46 enters threaded orifice 51 residing within the forward portion 30 of second wheel chock 29. Since threaded orifice 51 occupies substantially the entire width of the forward portion 30 of second chock 29, rotation of threaded rod 46 permits second chock 29 to be urged laterally through a considerable distance. As shown in FIG. 1, threaded rod 46 is supported by bearing 53, bearing 53 residing in a central region of platform 16 and being rigidly affixed thereto.

Referring to FIG. 1, and as stated earlier, there will be applications where platform 16 is not rigidly attached to floor 2. In those cases, the platform 16 may be mounted by means of bolts residing in slots (not shown), the slots being parallel to the longitudinal axis of the vehicle, thereby permitting the platform to slide longitudinally along floor 2. In this case, stress and long term damage to floor 2 may be avoided by use of a spring system. The spring system ideally would include a rear spring block 54 rigidly mounted to floor 2, and aligned with rear platform spring block 55 which resides in a rear region of platform 16. Shock absorbing springs 56 and 57 pass between blocks 54 and 55, thereby absorbing the force created by the vehicle as it presses against the platform and settles into the chocks 25 and 29. Similarly, a forward spring block 58 is mounted on floor 2 and aligned with forward platform spring block 59 which is rigidly mounted to platform 16. A pair of shock absorbing springs 60 and 61 passes between blocks 59 and 58 thereby absorbing and dampening movement of platform 16.

Operation of the wheel clamp assembly may be appreciated by reference to FIGS. 1 and 2. In FIG. 2, chocks 25 and 29 are drawn inwardly toward a central region of floor 2, thereby allowing hold down clamps 33 and 38 to collapse within recesses 37 and 39, respectively. When a vehicle 5, as shown in FIG. 1, enters the chocks, tire 11 engages wheel chock 25 and tire 12 engages chock 29. However, initially, the side walls of the wheel chocks are not in engagement with the tires, nor have the hold down clamps engaged the inner surface of the tires. Therefore, motor 43 is operated such that threaded rods 44 and 46 force chocks 25 and 29 outwardly, thereby causing hold down clamps 33 and 38 to gradually move to an upright orientation, with flanges 36 and 42 assuming a substantially horizontal orientation. Ideally, flange 36 will mechanically engage the inner surface of tire 11 while flange 42 will mechanically engage the inner surface of tire 12, thereby providing a secure three-dimensional engagement of vehicle 5 during shipment. As seen in FIG. 1, several additional features may be added to optimize operation of wheel clamp 1. For example, wedges 62 and 63 may be attached to floor 2 adjacent to chocks 25 and 29 such that hold down clamps 33 and 38 rest against and are supported by wedges 62 and 63, and are prevented from assuming a completely horizontal position, thereby aiding their upward travel as the chocks 25 and 29 are moved outwardly. Similarly, tire guides 64 and 65 may be mounted adjacent to platform 16 on car floor 2 to aid in guiding tires 11 and 12 into their respective wheel chocks.

In practice, utilizing an electric motor system, the securing and unsecuring operation each take approximately ten seconds. The hand crank system consumes approximately sixty-four seconds for each operation and use of the portable electrical system consumes approximately fifteen seconds for each operation. Also, a complete field installation would include shields (not shown) around chains 45 and 47 as well as threaded rods 44 and 46, so as to protect the operator from inadvertent contact with moving mechanical parts and to protect the equipment from weather.

Although the embodiments described herein set forth the best mode of practicing the invention as contemplated by the inventor, those skilled in the art will recognize that various modifications may be made to the invention set forth herein without departing from the spirit and scope of the claims appended hereto.

I claim:

1. An improved wheel clamp comprising:
   (a) a first wheel chock, the wheel chock being configured so as to receive a wheel, the first wheel chock being slidably mounted so as to be capable of movement along a single transverse axis;
   (b) a second wheel chock, the second wheel chock being adapted to receive a wheel, the second wheel chock being slidably mounted so as to be capable of one dimensional movement along the single transverse axis;
   (c) at least one threaded rod, the threaded rod having a first end and a second end, the first end having an opposite handed thread from the second end, the first end of the threaded rod being engaged in a threaded orifice within the first wheel chock, the second end of the threaded rod being threadably engaged into a threaded orifice within the second wheel chock, such that rotation of the threaded rod in a first direction urges the first and second wheel chocks toward each other, and rotation of the threaded rod in a second direction urges the first and second wheel chocks away from each other;
   (d) a substantially planar base member, the first and second wheel chocks being slidably mounted on the substantially planar base member, the planar base member having a longitudinal axis and a transverse axis, the one dimensional movement of the first and second wheel chocks being parallel to the transverse axis of the planar base member; and
   (e) a first hold down clamp and a second hold down clamp, the first and second hold down clamps being pivotally mounted on the planar base member, at least a portion of the first hold down clamp being in an abutting relationship with the first wheel chock, an at least a portion of the second hold down clamp being in an abutting relationship with the second wheel chock such that operation of the threaded rod which causes the first and second wheel chocks to move away from each other causes rotation of the hold down clamps so as to engage the wheel.

2. The wheel clamp of claim 1, wherein the first hold down clamp comprises:
   (a) a body portion, the body portion having a first end and a second end, the first end being formed so as to be pivotable about a shaft in a region adjacent to the substantially planar base member; and
   (b) a flange, the flange being affixed to the second end of the body portion.

3. The wheel clamp of claim 2, wherein the flange is formed as a curved shell, the curved shell being contoured so as to mate with an inner surface of a wheel hub.

4. The wheel clamp of claim 3, wherein the flange is substantially orthogonal to the body portion of the first hold down clamp.

5. The wheel clamp of claim 4, further comprising at least one tension carrying member, the tension carrying member having a first end and a second end, the first end being affixed to the first hold down clamp and the second end being affixed to the first wheel chock such that movement of the first wheel chock away from the wheel will tend to urge at least a portion of the first hold down clamp away from the wheel.

6. The wheel clamp of claim 5, further comprising at least one spring member, the spring member having a first end and a second end, the first end being coupled to the substantially planar base member and the second end being coupled to a member external to the wheel clamp, thereby absorbing shock between the wheel clamp and the external member.

7. The wheel clamp of claim 6, wherein the spring member is oriented so as to dampen forces acting parallel to the longitudinal axis of the substantially planar base member.

8. The wheel clamp of claim 7, further comprising at least one wheel guide member, the wheel guide member serving to guide a wheel approaching a wheel chock into a position so as to be engageable by the wheel chock.

9. A vehicle securing apparatus, comprising:
   (a) a first wheel chock, the first wheel chock being adapted to receive a vehicle tire, the first wheel chock having a front portion and a rear portion;
   (b) a second wheel chock, the second wheel chock being adapted to receive a vehicle tire, the second wheel chock having a front portion and a rear portion,
   (c) a first tubular member, the first tubular member having a first end and a second end, the first end being coupled to the front portion of the first chock, the second end being coupled to the front portion of the second chock, wherein at least the first tubular member is threaded, the first tubular member being rotatable about a longitudinal axis so as to accomplish alteration of a spatial relationship between the first and second wheel chocks;
   (d) a second tubular member, the second tubular member having a first end and a second end, the first end being coupled to the rear portion of the first chock, and the second being coupled to the rear portion of the second chock, such that manipulation of the first and second tubular members may alter the spatial relationship between the first wheel chock and the second wheel chock;
   (e) a base member, the base member having a longitudinal axis and a lateral axis, the first and second wheel chocks being slidably mounted on the base member so as to be movable parallel to the lateral axis;
   (f) a motor, the motor being operatively connected to at least the first tubular member so as to cause rotation of the first tubular member;
   (g) a first sprocket wheel, the first sprocket wheel being affixed to the first tubular member;
   (h) a second sprocket wheel, the second sprocket wheel being affixed to the motor;
   (i) a chain, the chain being operatively interconnected between the first sprocket wheel and the second sprocket wheel, thereby transferring rotational movement from the motor to the first tubular member; and
   (j) at least a first hold down clamp, the hold down clamp being pivotably affixed adjacent to the first wheel chock, such that movement of the first wheel chock toward a first vehicle tire causes the first hold down clamp to engage a surface of the tire.

* * * * *

UNITED STATES PATENT AND TRADEMARK OFFICE
CERTIFICATE OF CORRECTION

PATENT NO. : 5,173,018
DATED : December 22, 1992
INVENTOR(S) : JAMES L. KISSEL et al.

It is certified that error appears in the above-identified patent and that said Letters Patent is hereby corrected as shown below:

On title page, item [54] and col. 1, in the title, "VEHICLES" should read --VEHICLE--.
    In item [76], for "Cedar Rapids, S. Dak. 57702" read --Rapid City, S. Dak. 57702--.
    In column 1, line 20, for "at" read --a--.
    In column 4, line 34, after "hold" insert --down--.
    In column 4, line 48, for "web" read --flange--.
    In column 5, line 54, for "59 and 58" read --58 and 59--.
    In column 7, line 3, for "an" read --and--

Signed and Sealed this

Sixteenth Day of November, 1993

Attest:

BRUCE LEHMAN

*Attesting Officer*      *Commissioner of Patents and Trademarks*